US012504072B2

(12) United States Patent
Ito et al.

(10) Patent No.: US 12,504,072 B2
(45) Date of Patent: Dec. 23, 2025

(54) PISTON RING, PISTON RING ASSEMBLY, AND RECIPROCATING COMPRESSOR

(71) Applicant: KOBE STEEL, LTD., Hyogo (JP)

(72) Inventors: Hirotaka Ito, Kobe (JP); Yuya Murata, Kobe (JP); Takumi Kitayama, Kobe (JP); Naofumi Kanei, Takasago (JP)

(73) Assignee: KOBE STEEL, LTD., Hyogo (JP)

( * ) Notice: Subject to any disclaimer, the term of this patent is extended or adjusted under 35 U.S.C. 154(b) by 0 days.

(21) Appl. No.: 18/604,404

(22) Filed: Mar. 13, 2024

(65) Prior Publication Data

US 2024/0328510 A1 Oct. 3, 2024

(30) Foreign Application Priority Data

Mar. 31, 2023 (JP) ................................. 2023-058288

(51) Int. Cl.

*F16J 9/12* (2006.01)
*F04B 39/00* (2006.01)
*F04B 53/14* (2006.01)

(52) U.S. Cl.

CPC ............ *F16J 9/12* (2013.01); *F04B 39/0005* (2013.01); *F04B 53/143* (2013.01)

(58) Field of Classification Search

CPC ......... F16J 9/12; F16J 9/26; F16J 9/28; F04B 53/143; F04B 39/0005; F04B 39/042

See application file for complete search history.

(56) References Cited

U.S. PATENT DOCUMENTS

2021/0156371 A1* 5/2021 Kanei ........................ F16J 9/16

FOREIGN PATENT DOCUMENTS

| | | | | | |
|---|---|---|---|---|---|
| CN | 1727408 A | * | 2/2006 | C08K 7/14 |
| JP | H11-082741 A | | 3/1999 | |
| JP | H1182741 A | * | 3/1999 | B29D 99/00 |
| JP | 2007-192242 A | | 8/2007 | |
| JP | 2014-005732 A | | 1/2014 | |
| JP | 2018-162412 A | | 10/2018 | |
| JP | 2019-190628 A | | 10/2019 | |
| JP | 2023-025840 A | | 2/2023 | |
| JP | 2023-025841 A | | 2/2023 | |

* cited by examiner

*Primary Examiner* — Loren C Edwards

(74) *Attorney, Agent, or Firm* — Studebaker Brackett PLLC

(57) ABSTRACT

A piston ring is a piston ring for use in an oil-free-type reciprocating compressor for compressing hydrogen gas, the piston ring containing thermoplastic polyimide as a main component and carbon fiber and/or graphite as an additive, and having a tensile strength of 90 MPa or more and a bending strength of 150 MPa or more.

7 Claims, 5 Drawing Sheets

50
58a
58b
56
60
65
67
66
58
54
52
CRANK MECHANISM

RESIN P1
RESIN P2
RESIN P3
RESIN P4
TENSILE STRENGTH(MPa)
BENDING STRENGTH(MPa)
40
50
60
70
80
90
100
110
120
130
140
150
160
210
200
190
180
170
160
150
140
130
120
110
100

HIGH-TEMPERATURE CHARACTERISTICS
COMPRESSION STRENGTH(MPa)
160
140
120
100
80
60
40
20
0
TEMPERATURE(°C)
LA
LB
LC
LD
EXAMPLE 1(P1)
EXAMPLE 2(P2)
EXAMPLE 3(P3)
COMPARATIVE EXAMPLE 1(P4)

PISTON RING, PISTON RING ASSEMBLY, AND RECIPROCATING COMPRESSOR

FIELD OF INVENTION

The present invention relates to a piston ring and a piston ring assembly for use in a reciprocating compressor for compressing hydrogen gas, and the reciprocating compressor.

BACKGROUND ART

In recent years, in consideration of the environment, use of hydrogen for power generation, as fuel for an automobile, and the like is considered, so that a demand for hydrogen is increasing. JP 2007-192242 A discloses a piston ring that is not for use in a compressor that compresses hydrogen gas but has good heat resistance, frictional wear characteristics, and sealing characteristics. The piston ring disclosed in this publication contains a thermoplastic polyimide resin as a main component.

JP H11-82741 A discloses a combination of a piston that reciprocates without lubrication and a compression ring attached to the piston. The compression ring has a composition of fluororesin: 5 to 15%, carbon fiber: 3 to 15%, graphite: 5 to 15%, and the remainder: polyimide resin.

In a reciprocating compressor for hydrogen gas compression for use in a hydrogen station or the like, an oil-free-type compressor may be required in order to avoid contamination of impurities. In an oil-free-type reciprocating compressor, a piston ring may be used in a high-temperature environment. For this reason, use of a thermoplastic polyimide resin has been studied as a material having excellent heat resistance and wear resistance. However, in JP 2007-192242 A, a sliding test under oil lubrication was performed, and wear resistance in an oil-free environment was not evaluated. In addition, since no wear test in a hydrogen environment was performed, it cannot be said that factors affecting wearability in a hydrogen environment are suggested. Specifically, since there is a possibility that under a hydrogen atmosphere, a piston ring containing thermoplastic polyimide as a main component exhibits a wear behavior different from that in air, it cannot be said that an index for determining whether or not to adopt the piston ring in an actual machine as a reciprocating compressor for hydrogen gas compression is suggested by a wear test in the atmosphere alone. In addition, since a sliding test in a hydrogen environment was not performed either in JP H11-82741 A, it cannot be said that factors affecting wearability in a hydrogen environment are suggested. The same applies to JP 2023-25840 A and JP 2023-25841 A.

SUMMARY OF THE INVENTION

An object of the present invention is to provide a piston ring that is for use in a hydrogen gas compressor in an oil-free environment, contains a thermoplastic polyimide resin as a main component, and is excellent in heat resistance and wear resistance.

A piston ring according to one aspect of the present invention is a piston ring for use in an oil-free-type reciprocating compressor for compressing hydrogen gas. The piston ring contains thermoplastic polyimide as a main component, and carbon fiber and/or graphite as an additive, and has a tensile strength of 90 MPa or more and a bending strength of 150 MPa or more.

A piston ring assembly according to one aspect of the present invention includes: the piston ring; and a seal ring that is disposed adjacent to the piston ring, has a tensile strength lower than a tensile strength of the piston ring and has a bending strength lower than a bending strength of the piston ring.

An oil-free-type reciprocating compressor for compressing hydrogen gas according to one aspect of the present invention includes the piston ring.

DETAILED DESCRIPTION

In the following, embodiments of the present invention will be described in detail with reference to the drawings.

A reciprocating compressor according to the present embodiment is used for boosting hydrogen gas to a predetermined pressure (e.g., from 0.7 MPa to 82 MPa) in a hydrogen station. Hydrogen gas compressed by the reciprocating compressor is stored in an accumulator (not illustrated), cooled in a pre-cooler (not illustrated) through heat exchange with brine or the like, and then filled in a tank of a fuel cell vehicle by a dispenser (not illustrated). The reciprocating compressor is not limited to be used in a hydrogen station as long as it is an oil-free-type compressor for use in compressing hydrogen gas.

Figure 1:
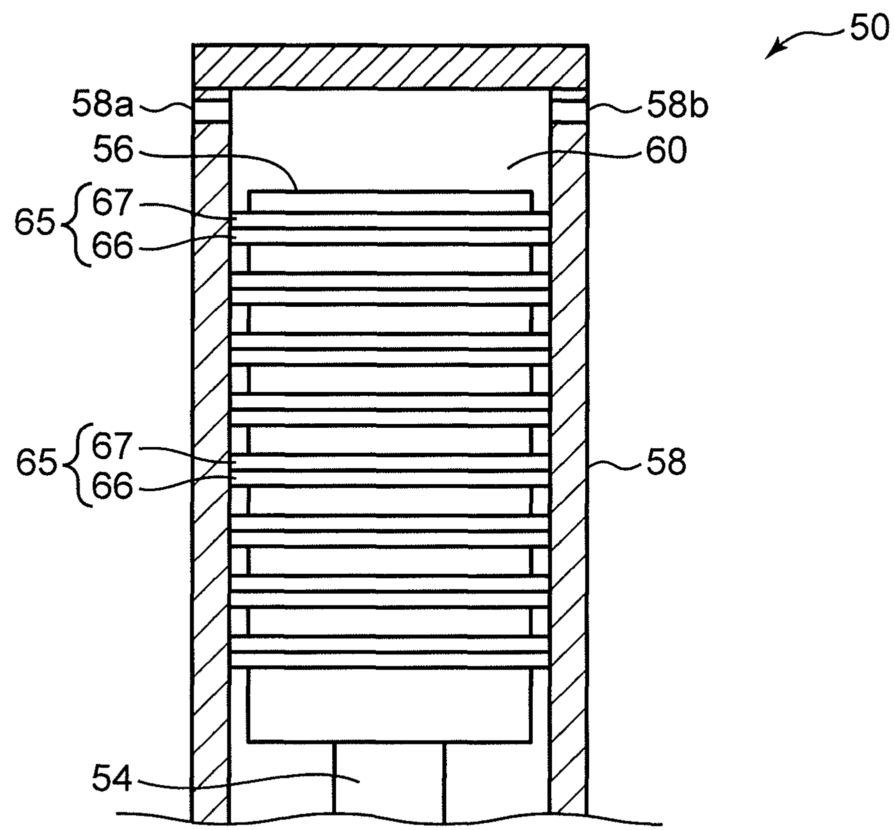
FIG. 1 is a sectional view schematically illustrating a reciprocating compressor according to an embodiment.
Figure 1:
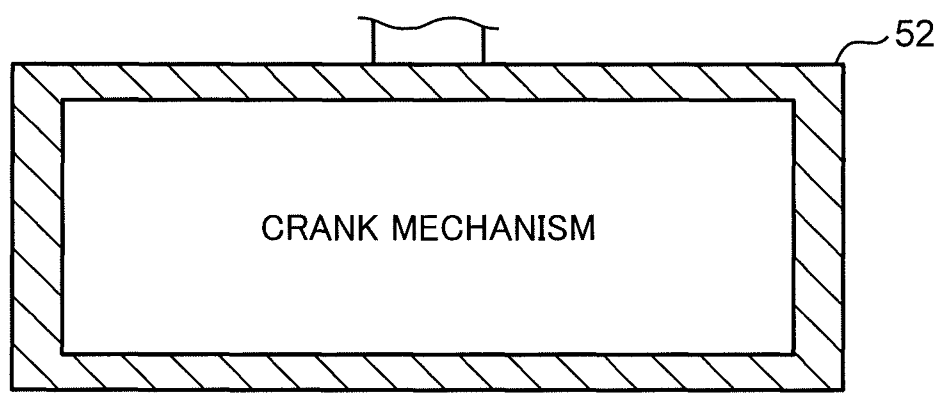

As illustrated in FIG. 1, a reciprocating compressor 50 includes a crank mechanism 52, a piston rod 54 driven by the crank mechanism 52, a piston 56 connected to the piston rod 54, and a cylinder part 58 that accommodates the piston 56.

The cylinder part 58 is provided with a suction port **58*a* for allowing hydrogen gas to flow into a space in the cylinder part 58 and a discharge port 58*b* for discharging hydrogen gas compressed in the space. Each of the suction port 58*a* and the discharge port 58*b* is provided with a valve (not illustrated). Of the space in the cylinder part 58, a space in which the suction port 58*a* and the discharge port 58*b* are opened functions as a compression chamber 60**.

The reciprocating compressor 50 also includes a plurality of piston ring assemblies 65 attached to an outer peripheral surface of the piston 56 and disposed in sliding contact with an inner peripheral surface of the cylinder part 58. The compression chamber 60 is partitioned from other space in the cylinder part 58 by the piston ring assembly 65. This "other space" may be a space that does not function as the compression chamber 60, or may be another compression chamber on a low-pressure side that compresses hydrogen gas before being introduced into the compression chamber 60 in a case where the reciprocating compressor 50 is constituted by a tandem type compressor.

Each piston ring assembly 65 has a piston ring 66, and a seal ring 67 disposed on a high-pressure side with respect to the piston ring 66. In other words, in each piston ring assembly 65, the seal ring 67 is located on a side of the compression chamber 60 with respect to the piston ring 66. Both the piston ring 66 and the seal ring 67 are in sliding contact with the inner peripheral surface of the cylinder part 58.

Figure 2:
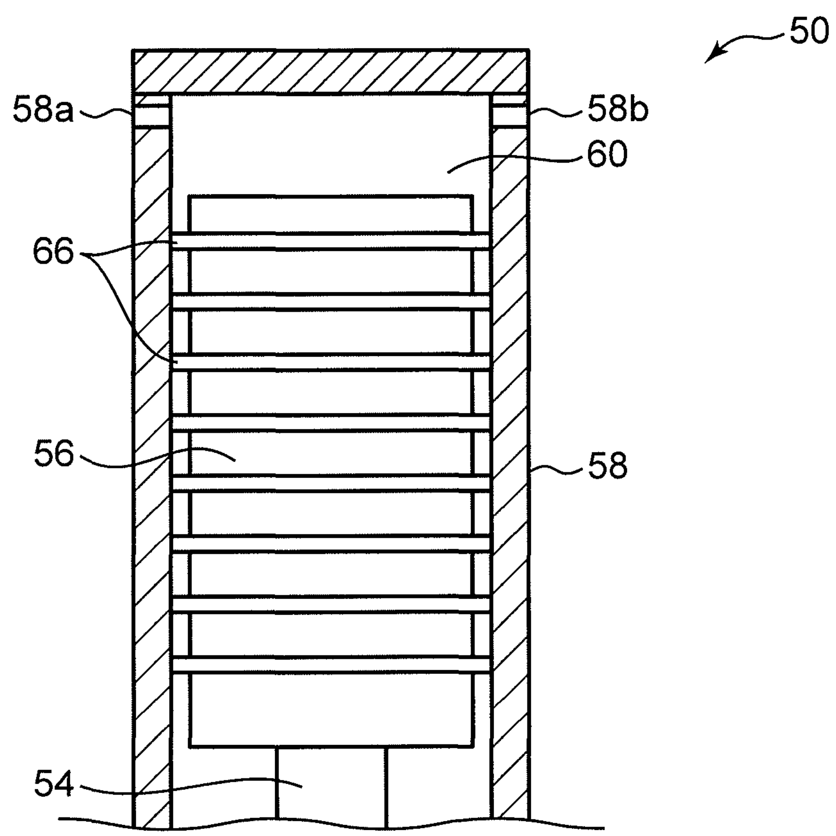
FIG. 2 is a sectional view schematically illustrating a part of a reciprocating compressor according to another embodiment.

Although the reciprocating compressor 50 of the present embodiment includes the plurality of piston ring assemblies 65, the reciprocating compressor may include only one piston ring assembly 65. As illustrated in FIG. 2, the seal ring 67 may be omitted.

The piston ring 66 is made of a resin containing thermoplastic polyimide (TPI) as a main component and carbon fiber and/or graphite as an additive. That is, this resin contains 50% or more thermoplastic polyimide (TPI) by weight. This resin may contain polytetrafluoroethylene. This resin has a tensile strength of 90 MPa or more and a bending strength of 150 MPa or more. Therefore, the strength of the resin is high to be hardly broken. Graphite is added for the purpose of improving thermal conductivity in order to prevent deterioration of heat resistance (=high-temperature strength, etc.) due to frictional heat generation.

More preferably, the resin constituting the piston ring 66 may have a tensile strength of 110 MPa or more and a bending strength of 160 MPa or more. In this case, the resin does not contain polytetrafluoroethylene.

The seal ring 67 has a tensile strength lower than the tensile strength of the piston ring 66 and a bending strength lower than the bending strength of the piston ring 66.

The "tensile strength" as used herein is a value of a tensile strength measured based on JIS K7161-1 (Plastics-Determination of Tensile Characteristics, Part 1: General Rules). The "bending strength" is a value of a bending strength measured based on JIS K7171 (Plastics—Determination of Bending Characteristics).

Since sealability is required of the seal ring 67, a resin having a strength lower than that of the resin constituting the piston ring 66 is used. When the seal ring 67 is deformed (protrudes outward and comes into close contact with the inner peripheral surface of the cylinder part 58) at the time of compressing gas, sealability by the piston ring assembly 65 is secured. This enables compression of the gas in the compression chamber 60. On the other hand, a resin having a high strength and being hardly broken is used for the piston ring 66 functioning as a backup ring. As a result, it is possible to obtain a long life.

The seal ring 67 is made of a resin containing thermoplastic polyimide (TPI) as a main component and polytetrafluoroethylene and carbon fiber as additives. The seal ring 67 may be made of a resin containing polytetrafluoroethylene as a main component.

The piston ring 66 of the present embodiment is made of a resin containing thermoplastic polyimide (TPI) as a main component and carbon fiber and/or graphite as an additive, and further, has a tensile strength of 90 MPa or more and a bending strength of 150 MPa or more. Therefore, also when the piston ring 66 is used in the oil-free-type reciprocating compressor 50 for compressing hydrogen gas, heat resistance and wear resistance of the piston ring 66 can be improved.

EXAMPLES

A test for confirming that the piston ring 66 of the present embodiment has wear resistance and high temperature characteristics also in a hydrogen gas atmosphere was conducted, and results thereof will be described.

First, wear characteristics were evaluated using test pieces made of resins of Examples 1-1, 1-2, 2-1, 2-2, 3-1, and 3-2, and Comparative Examples 1-1 and 1-2.

In Examples 1-1 and 1-2, a resin P1 having the same composition, tensile strength, and bending strength is used. The resin P1 contains thermoplastic polyimide (TPI) as a main component, contains carbon fiber and graphite as additives, and does not contain polytetrafluoroethylene.

In Examples 2-1 and 2-2, a resin P2 having a composition, a tensile strength, and a bending strength different from those of the resin P1 is used. The resin P2 contains thermoplastic polyimide (TPI) as a main component, contains carbon fiber and graphite as additives, and does not contain polytetrafluoroethylene.

In Examples 3-1 and 3-2, a resin P3 having a composition, a tensile strength, and a bending strength different from those of the resins P1 and P2 is used. The resin P3 contains thermoplastic polyimide (TPI) as a main component, contains carbon fiber and graphite as additives, and contains polytetrafluoroethylene (PTFE) as an additive.

In Comparative Examples 1-1 and 1-2, a resin P4 having a composition, a tensile strength, and a bending strength different from those of the resins P1, P2, and P3 is used. The resin P4 contains thermoplastic polyimide (TPI) as a main component, and contains carbon fiber and graphite as additives. The resin P4 contains polytetrafluoroethylene (PTFE) as an additive. As will be described later, the resin P4 according to Comparative Examples 1-1 and 1-2 is inferior in tensile strength and bending strength to the resins P1, P2, and P3 according to Examples 1-1, 1-2, 2-1, 2-2, 3-1, and 3-2.

The tensile characteristics were evaluated based on a tensile strength measured based on JIS K7161-1 (Plastics—Determination of Tensile Characteristics, Part 1: General Rules). The bending characteristics were evaluated based on a bending strength measured based on JIS K7171 (Plastics—Determination of Bending Characteristics).

Figure 3:
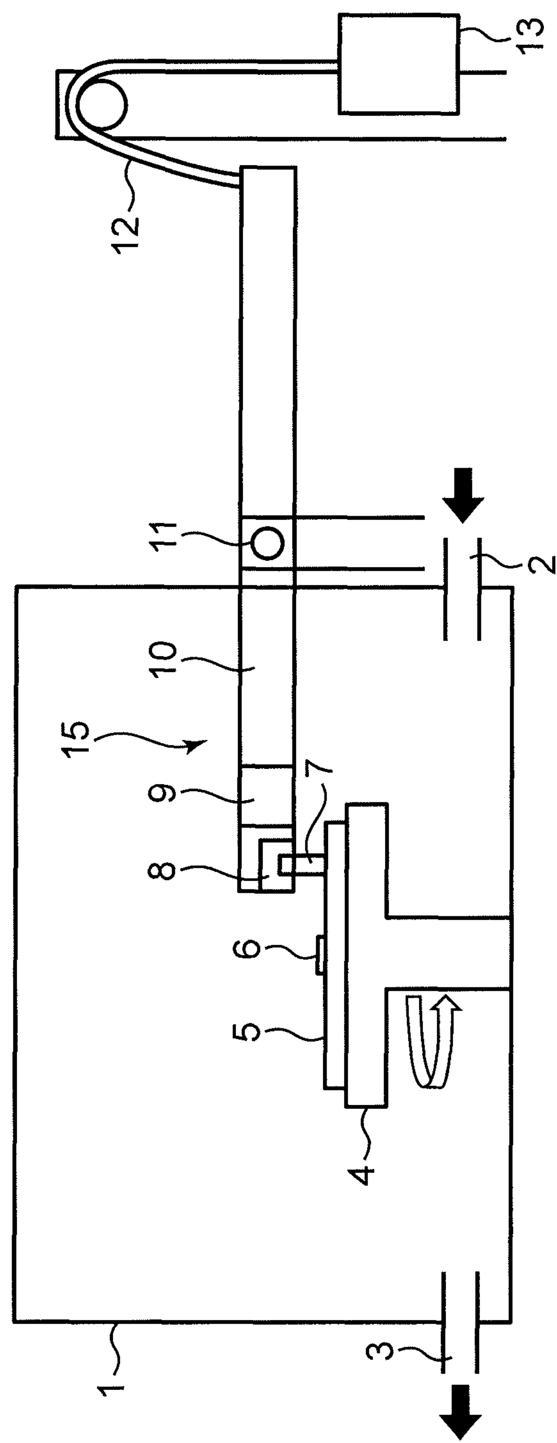
FIG. 3 is a view schematically illustrating a sliding test device for use in evaluating wear characteristics.

The wear characteristics were evaluated based on a measurement value obtained by a sliding test device illustrated in FIG. 3. The sliding test device is a pin-on-disk type sliding test device, and has a chamber 1 configured to be able to introduce hydrogen gas. The chamber 1 is provided with a gas inlet 2 for allowing hydrogen gas to be introduced into the chamber 1, and a gas outlet 3 for allowing gas to flow out from the inside of the chamber 1. In the chamber 1, a fixing part 8 configured to fix a test piece 7, and a rotation table 4 to which a metal plate 5 is attached by a fixing screw 6 and which configured to rotate the metal plate 5 are provided. The test piece 7 attached to the fixing part 8 is pressed against the metal plate 5 by a pressing mechanism 15. The pressing mechanism 15 has a pressure application rod 10 provided so as to be swingable about a fulcrum part 11, a weight 13 attached to a proximal end of the pressure application rod 10 via a wire 12, and the fixing part 8 provided at a distal end of the pressure application rod 10. A load cell 9 is attached to the pressure application rod 10.

The test piece 7 is fixed to the fixing part 8 of the pressure application rod 10. The test piece 7 fixed to the fixing part 8 is to be pressed against the metal plate 5 with a predetermined load by a weight of the weight 13. When the rotation table 4 rotates the metal plate 5 at a predetermined rotation speed in this state, the test piece 7 slides on the metal plate 5 at a predetermined speed.

The test piece 7 is processed into a pin shape having a diameter q of 5.0 mm and a length of 10.0 mm, and a surface roughness Ra of a sliding surface is adjusted to 1.0 μm or less. The metal plate 5 is obtained by processing chromium molybdenum steel (SCM 435) on a disk, and has a surface roughness Ra adjusted to 0.2 μm.

A pressing load of the test piece 7 against the metal plate 5 is 9.66 MPa. In a state where the inside of the chamber 1 was filled with hydrogen gas, with a sliding speed set to 2.0 m/s and a sliding distance set to 20,000 m, a test was performed at room temperature. Then, a wear amount ($mm^3$) of the test piece 7 was calculated from a weight difference of the test piece 7 before and after a sliding test and a material density of the test piece 7, and a wear amount per unit load and unit distance was taken as a specific wear amount ($mm^3$/N·m).

Test results of tensile characteristics, bending characteristics, and wear characteristics of the resins P1 to P4 of Examples 1-1, 1-2, 2-1, 2-2, 3-1, and 3-2 and Comparative Examples 1-1 and 1-2 are shown in Table 1 below.

Table 1

TABLE 1

| | Tensile strength (MPa) | Bending strength (MPa) | Wear amount ($mm^3$) | Specific wear amount ($\times 10^{-8}$ $mm^3$/N · m) |
|---|---|---|---|---|
| Example1-1(P1) | 111 | 162 | 0.255 | 6.73 |
| Example1-2(P1) | 111 | 162 | 0.290 | 7.65 |
| Example2-1(P2) | 129 | 183 | 0.187 | 4.95 |
| Example2-2(P2) | 129 | 183 | 0.226 | 5.97 |
| Example3-1(P3) | 94.3 | 159 | 0.174 | 4.58 |
| Example3-2(P3) | 94.3 | 159 | 0.187 | 4.93 |
| Comparative Example1-1(P4) | 80.3 | 133 | 0.314 | 8.28 |
| Comparative Example1-2(P4) | 80.3 | 133 | 0.433 | 11.4 |

Next, high-temperature characteristics of the test piece 7 were evaluated based on compression characteristics at normal temperature (23° C.) and high temperature (150° C.) in the air. Since a test in a high-temperature hydrogen gas atmosphere is dangerous, the evaluation was performed in air.

The test piece 7 (with the pin shape having a diameter q of 5.0 mm and a length of 10.0 mm) was subjected to a compression rupture test at a test speed of 1 mm/min in environments of normal temperature (23° C.) and high temperature (150° C.) using a universal testing machine. Then, a maximum stress obtained from stress (load) and strain (crosshead displacement of the testing machine) diagrams obtained by this test was defined as a compression strength.

Test results of high-temperature characteristics at normal temperature (23° C.) in the air performed on the test pieces 7 made of resins of Examples 1-3, 1-4, 1-5, 2-3, 2-4, 2-5, 3-3, 3-4, and 3-5 and Comparative Examples 1-3, 1-4, and 1-5 are shown in Table 2 below.

In Examples 1-3, 1-4, and 1-5, the same resin P1 as in Examples 1-1 and 1-2 is used. In Examples 2-3, 2-4, and 2-5, the same resin P2 as in Examples 2-1 and 2-2 is used. In Examples 3-3, 3-4, and 3-5, the same resin P3 as in Examples 3-1 and 3-2 is used. In Comparative Examples 1-3, 1-4, and 1-5, the same resin P4 as in Comparative Examples 1-1 and 1-2 is used.

Table 2

TABLE 2

| | Compression strength (MPa) (23° C.) |
|---|---|
| Example1-3(P1) | 127 |
| Example1-4(P1) | 119 |
| Example1-5(P1) | 128 |
| Example2-3(P2) | 140 |
| Example2-4(P2) | 142 |
| Example2-5(P2) | 151 |
| Example3-3(P3) | 131 |
| Example3-4(P3) | 126 |
| Example3-5(P3) | 121 |
| Comparative Example1-3(P4) | 114 |
| Comparative Example1-4(P4) | 116 |
| Comparative Example1-5(P4) | 111 |

Test results of high-temperature characteristics at high temperature (150° C.) performed on the test pieces 7 made of the resins of Examples 1-6, 1-7, 1-8, 2-6, 2-7, 2-8, 3-6, 3-7, and 3-8 and Comparative Examples 1-6, 1-7, and 1-8 are shown in Table 3 below.

In Examples 1-6, 1-7, and 1-8, the resin P1 having the same composition as in Examples 1-1 and 1-2 is used. In Examples 2-6, 2-7, and 2-8, the resin P2 having the same composition as in Examples 2-1 and 2-2 is used. In Examples 3-6, 3-7, and 3-8, the resin P3 having the same composition as in Examples 3-1 and 3-2 is used. In Comparative Examples 1-6, 1-7, and 1-8, the resin P4 having the same composition as in Comparative Examples 1-1 and 1-2 is used.

Table 3

TABLE 3

| | Compression strength (MPa) (150° C.) |
|---|---|
| Example1-6(P1) | 86 |
| Example1-7(P1) | 76 |
| Example1-8(P1) | 73 |
| Example2-6(P2) | 83 |
| Example2-7(P2) | 90 |
| Example2-8(P2) | 87 |
| Example3-6(P3) | 72 |
| Example3-7(P3) | 73 |
| Example3-8(P3) | 72 |
| Comparative Example1-6(P4) | 62 |
| Comparative Example1-7(P4) | 64 |
| Comparative Example1-8(P4) | 62 |

Figure 4:
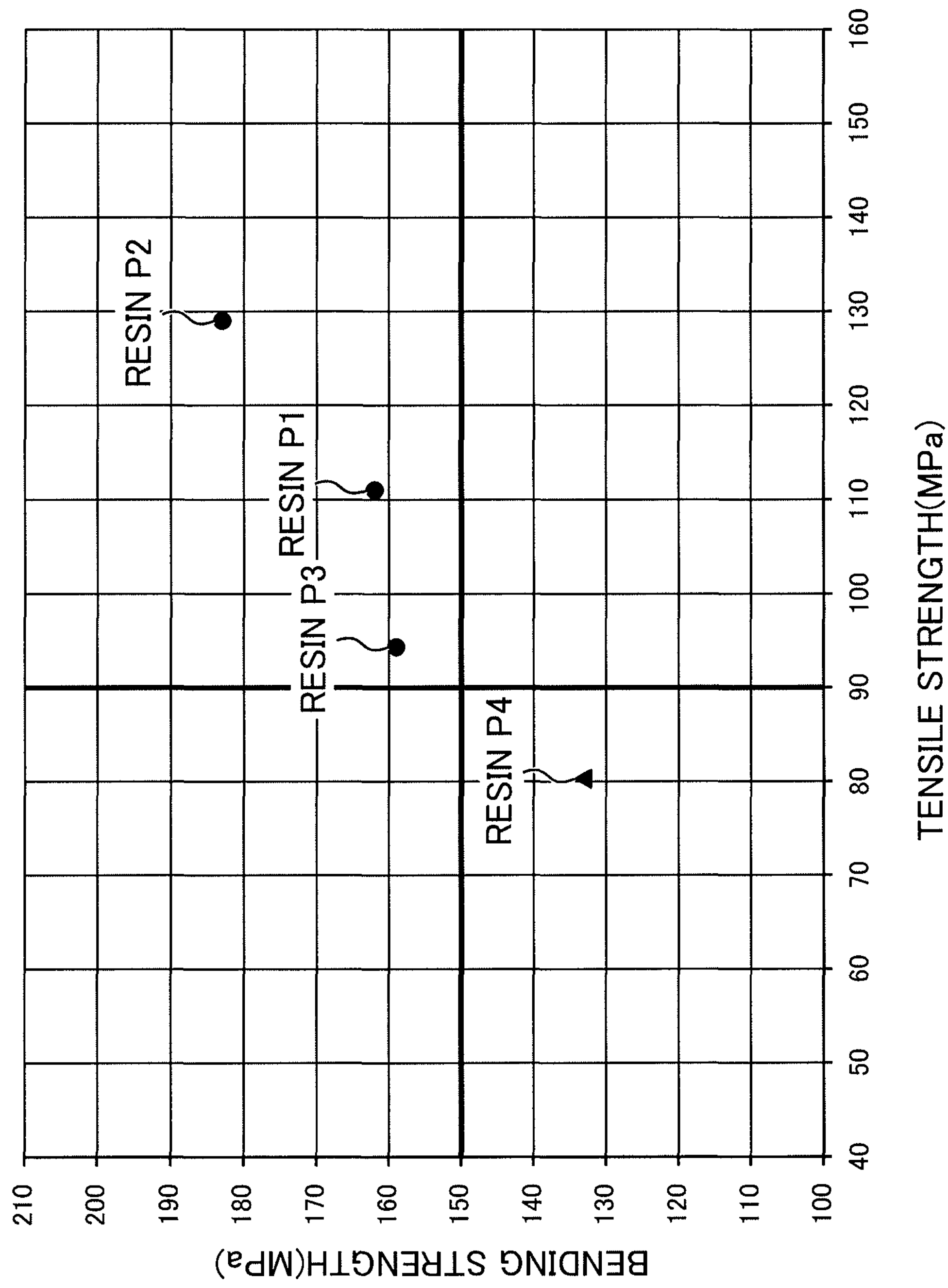
FIG. 4 is a diagram showing a relationship between a tensile strength and a bending strength in Examples and Comparative Example.

As shown in Table 1, in Comparative Examples 1-1 and 1-2, the wear amount and the specific wear amount are larger than those in Examples 1-1, 1-2, 2-1, 2-2, 3-1, and 3-2. Specifically, as shown in FIG. 4, the resins P1 to P3 of Examples 1-1, 1-2, 2-1, 2-2, 3-1, and 3-2 have a tensile strength of 90 MPa or more and a bending strength of 150 MPa or more, while the resin P4 of Comparative Examples 1-1 and 1-2 has lower values of a tensile strength and a bending strength. From this result, it is understood that the wear characteristics in a hydrogen gas atmosphere can be improved by selecting a resin not only containing thermoplastic polyimide (TPI) as a main component and carbon fiber and/or graphite as an additive but also having a tensile strength of 90 MPa or more and a bending strength of 150 MPa or more.

Figure 5:
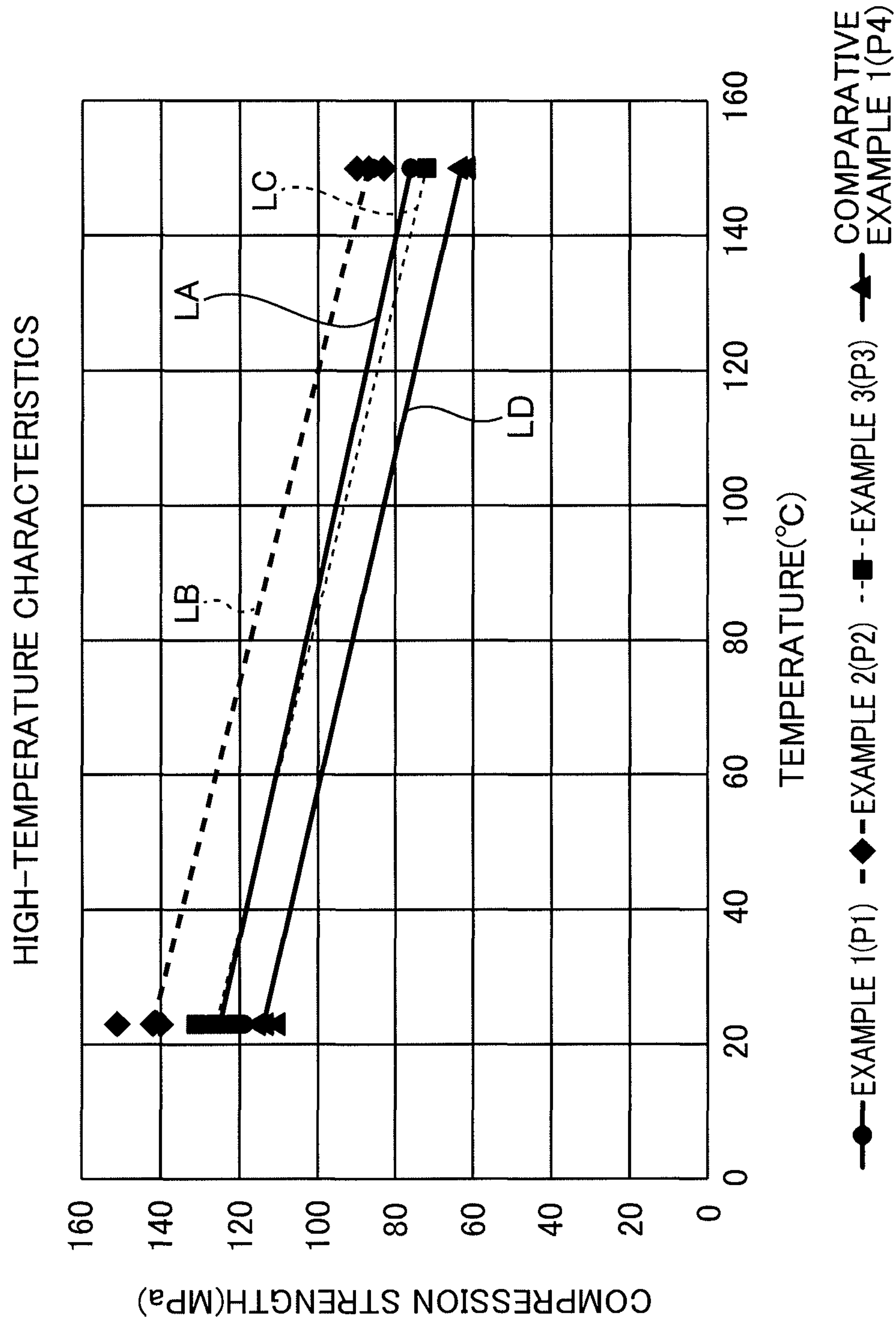
FIG. 5 is a diagram showing compression strengths in a room temperature environment and a high temperature environment in Examples and Comparative Example.

In addition, FIG. 5 is a diagram plotting values of compression strengths of Examples 1-3, 1-4, 1-5, 2-3, 2-4, 2-5, 3-3, 3-4, and 3-5 and Examples 1-6, 1-7, 1-8, 2-6, 2-7, 2-8, 3-6, 3-7, and 3-8, and Comparative Examples 1-3, 1-4, and 1-5 and Comparative Examples 1-6, 1-7, and 1-8 based on Tables 2 and 3.

FIG. 5 shows a linear approximation LA of Examples 1-3, 1-4, and 1-5 and Examples 1-6, 1-7, and 1-8 regarding the resin P1. A linear approximation LB of Examples 2-3, 2-4, and 2-5 and Examples 2-6, 2-7, and 2-8 regarding the resin P2 is shown. A linear approximation LC of Examples 3-3, 3-4, and 3-5 and 3-6, 3-7, and 3-8 regarding the resin P3 is shown. A linear approximation LD of Comparative Examples 1-3, 1-4, and 1-5 and Comparative Examples 1-6, 1-7, and 1-8 regarding the resin P4 is shown.

In each of the normal temperature (23° C.) environment and the high temperature (150° C.) environment, the compression strengths of Examples 1-3, 1-4, 1-5, 2-3, 2-4, 2-5, 3-3, 3-4, and 3-5 and Examples 1-6, 1-7, 1-8, 2-6, 2-7, 2-8, 3-6, 3-7, and 3-8 are higher than the compression strengths of Comparative Examples 1-3, 1-4, and 1-5 and Comparative Examples 1-6, 1-7, and 1-8. From this, it is apparent that selecting a resin having a tensile strength of 90 MPa or more and a bending strength of 150 MPa or more results in selecting a resin having excellent high temperature characteristics as well.

In particular, since a slope of the linear approximation LA is smaller than slopes of the other linear approximations LB2 to LD, the resin P1 (i.e., one having a tensile strength of 110 MPa or more and 130 MPa or less and a bending strength of 160 MPa or more and 180 MPa or less) used in Examples 1-3, 1-4, and 1-5 and Examples 1-6, 1-7, and 1-8 is considered to be more excellent in high-temperature characteristics.

It should be understood that the embodiments disclosed herein are illustrative in all respects and are not restrictive. The present invention is not limited to the above embodiments, and various modifications, improvements, and the like can be made without departing from the gist of the present invention. For example, each piston ring 66 of the present embodiment is made of a resin having a tensile strength of 90 MPa or more and a bending strength of 150 MPa or more, and the piston ring 66 and the seal ring 67 are laid side by side. Alternatively, two or more (typically, two) piston rings 66 made of any of the resins P1 to P3 according to Examples may be laid side by side to form a piston ring assembly. Furthermore, in this piston ring assembly, the seal ring 67 may further be laid by the piston ring 66.

Here, the embodiments will be outlined.

(1) The piston ring according to the embodiment is a piston ring for use in an oil-free-type reciprocating compressor for compressing hydrogen gas. The piston ring contains thermoplastic polyimide as a main component, and carbon fiber and/or graphite as an additive, and has a tensile strength of 90 MPa or more and a bending strength of 150 MPa or more.

In the piston ring, even when the piston ring is used in the oil-free-type reciprocating compressor that compresses hydrogen gas, heat resistance and wear resistance of the piston ring can be improved. This contributes to efficient supply of hydrogen gas.

(2) The piston ring may not contain polytetrafluoroethylene. In this case, the tensile strength may be 110 MPa or more, and the bending strength may be 160 MPa or more.

In this aspect, even when the piston ring is used in the oil-free-type reciprocating compressor that compresses hydrogen gas, heat resistance can be further improved.

(3) The piston ring may have the tensile strength of 130 MPa or less and the bending strength of 180 MPa or less.

(4) The piston ring assembly according to the embodiment includes: the piston ring; and a seal ring that is disposed adjacent to the piston ring, has a tensile strength lower than a tensile strength of the piston ring and has a bending strength lower than a bending strength of the piston ring.

Even when the piston ring is used in the oil-free-type reciprocating compressor that compresses hydrogen gas, sealability of the piston ring assembly can be improved.

(5) The oil-free-type reciprocating compressor for compressing hydrogen gas according to the embodiment includes the piston ring.

(6) The reciprocating compressor may further include a seal ring that is disposed on a high-pressure side of the piston ring, has a tensile strength lower than a tensile strength of the piston ring and has a bending strength lower than a bending strength of the piston ring.

As described above, it is possible to obtain a piston ring that is for use in a hydrogen gas compressor in an oil-free environment, contains a thermoplastic polyimide resin as a main component, and is excellent in heat resistance and wear resistance.

This application is based on Japanese Patent application No. 2023-058288 filed in Japan Patent Office on Mar. 31, 2023, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A piston ring for use in an oil-free-type reciprocating compressor for compressing hydrogen gas, wherein the piston ring contains thermoplastic polyimide as a main component, and carbon fiber and/or graphite as an additive, and has a tensile strength of 90 MPa or more and a bending strength of 150 MPa or more, wherein a specific wear amount of the piston ring is less than $8.28\times10^{-8}$ $mm^3$/N·m obtained by a measurement using a pin-on-disk type sliding test device in a hydrogen gas atmosphere under a condition of a pressing load of 9.66 MPa and a sliding speed of 2.0 m/s.

2. The piston ring according to claim 1, wherein the piston ring contains no polytetrafluoroethylene, and has a tensile strength of 110 MPa or more and a bending strength of 160 MPa or more.

3. The piston ring according to claim 2, wherein the piston ring has a tensile strength of 130 MPa or less, and a bending strength of 180 MPa or less.

4. A piston ring assembly comprising:

the piston ring according to claim 2; and a seal ring that is disposed adjacent to the piston ring, has a tensile strength lower than the tensile strength of the piston ring and has a bending strength lower than the bending strength of the piston ring.

5. An oil-free-type reciprocating compressor for compressing hydrogen gas, the oil-free-type reciprocating compressor comprising the piston ring according to claim 1.

6. The reciprocating compressor according to claim 5, further comprising:

a seal ring that is disposed on a high-pressure side of the piston ring, the seal ring having a tensile strength lower than the tensile strength of the piston ring and a bending strength lower than the bending strength of the piston ring.

7. A piston ring for use in an oil-free-type reciprocating compressor for compressing hydrogen gas, wherein the piston ring contains thermoplastic polyimide as a main component, and carbon fiber and/or graphite as an additive, and has a tensile strength of 90 MPa or more and a bending strength of 150 MPa or more, wherein a specific wear amount of the piston ring is less than $8.28\times10^{-8}$ $mm^3/N\cdot m$ obtained by a measurement using a pin-on-disk type sliding test device in a hydrogen gas atmosphere under a condition of a PV value being 19.32 MPa·m/s.

* * * * *